United States Patent [19]

Migliaccio

[11] Patent Number: 5,311,611
[45] Date of Patent: May 10, 1994

[54] IMAGING BALL LENS OPTICALLY IMMERSED WITH A FIBER OPTIC FACEPLATE

[75] Inventor: Richard A. Migliaccio, Centereach, N.Y.

[73] Assignee: AIL Systems, Inc., Deer Park, N.Y.

[21] Appl. No.: 58,273

[22] Filed: May 4, 1993

[51] Int. Cl.$^5$ .................................................. G02B 6/08
[52] U.S. Cl. .................................... 385/120; 385/33
[58] Field of Search ..................... 385/31, 33, 35, 120

[56] References Cited

U.S. PATENT DOCUMENTS

| | | | |
|---|---|---|---|
| 3,987,299 | 10/1976 | Mulder | 385/120 |
| 4,202,599 | 5/1980 | Tosswill | 385/120 |
| 5,165,774 | 11/1992 | Windross | 385/35 |

Primary Examiner—Frank Gonzalez
Assistant Examiner—Stephen W. Barns
Attorney, Agent, or Firm—Hoffmann & Baron

[57] ABSTRACT

An imaging ball lens for wide field of view applications includes three elements. A first element is a plano-convex lens element with a convex and planar surface, the convex surface positioned facing an object side of the lens. The second plano-convex lens element has a convex and a planar surface. The planar surface of the second lens element is positioned facing the object side of the lens such that it is optically coupled to the planar surface of the first lens element. Also included is a plano-concave fiber optic faceplate with a concave and a planar surface. The concave surface of the faceplate is optically coupled to the convex surface of the second lens element facing the object side of the lens such that it is optically immersed with the fiber optic faceplate. A curved focal plane formed at the convex surface of the second lens element is mapped into a flat focal plane at the planar surface of the fiber optic faceplate defining a clear image essentially free from coma and astigmatic aberration and displaying a minimum of chromatic aberration.

9 Claims, 4 Drawing Sheets

IMAGING BALL LENS OPTICALLY IMMERSED WITH A FIBER OPTIC FACEPLATE

BACKGROUND OF THE INVENTION

1. Field of the Invention

This invention relates to optical lenses, and more particularly relates to wide angle optical ball lenses.

2. Description of the Prior Art

Several major design criteria govern a lens design. These include field of view requirements for a particular application, i.e., the area visible through the lens, lens light gathering ability and lens image quality over a predetermined spectral range. Considerations critical to a lens designed for a wide field of view include variable or fixed focal length and variable or fixed f-number. The lens focal length (f) is the distance between the point of focus of light from an object side of the lens and the plane of the lens. F-number (the relative aperture) is the ratio of the diameter of the focal length of the lens to the entrance pupil ($\phi_{EP}$):

$$f\text{-number} = f/\phi_{EP}$$

The entrance pupil diameter is the aperture diameter of the lens diaphragm viewed from the object side of the lens.

A lens design for a specific application requires a lens designer to consider the relationship between lens focal length, lens light gathering ability and acceptable levels of optical aberration for the given application. For example, there is a tradeoff between entrance pupil (light collection diameter) and f-number for a fixed lens focal length. Also, lens images typically vary in intensity, decreasing from the center to the edge of the image, an optical aberration called vignetting. Vignetting occurs when angles of incident light from the object side enter the lens at field angles other than 0 degrees, i.e., off-axis incidence. The result of such off-axis incidence in a lens subject to vignetting is an image projected on a flat focal plane that fades off gradually, i.e., loses intensity, towards the peripheral image edges.

Astigmatic aberration is a lens defect (optical aberration) in consequence of which rays from a point source fail to meet at a focal point. Astigmatic aberration, like vignetting, results in a blurred or imperfect image. Varying the focal length and f-number of many wide field of view lens results in varying degrees of astigmatic aberration. Coma is an optical aberration affecting lens image quality where the image of a point source manifests itself as a comet shaped blur.

Traditional lenses for both photographic and video applications are typically designed to operate in the visible light spectral range. Wide field angle lenses used in the photographic industry are typically designed for use in the visible spectral range of 450 to 650 nanometers (nm). Charge coupled device (CCD) based imaging systems operate beyond the visible light range, displaying sensitivity within the near infrared spectral range. Accordingly, their performance in a spectral range extending beyond 650 nm, i.e., the near infrared (IR) range (600 to 1000 nm) is inadequate due to chromatic aberration.

Chromatic aberration is an optical aberration which greatly affects lens image quality over an extended spectral range, resulting from the fact that different transparent substances refract different wavelength light differently. Longitudinal chromatic aberration occurs when a lens fails to focus light of varied wavelengths within the same plane. Lateral chromatic aberration is a result of lateral image shifts in differing amounts for various light wavelengths, i.e. like a rainbow.

In order to utilize the extended spectral range sensitivity of a CCD array while minimizing chromatic aberration, conventional lenses used therewith are usually complex, typically comprising multiple elements. Even more complex are wide field of view lenses for use with CCD array sensors. Wide field of view camera lenses generally require at least five elements and are consequently large and expensive, the cost of the lens generally increasing with the number of elements.

One example of a commercially available, high quality, wide field angle lens is the NIKON TM AF Nikkor 50 mm f/1.4 lens, product no. 1903 manufactured by Nikon Inc. of Melville, N.Y. The NIKON TM 1903 lens is based on a complex design, containing 7 elements. Upon testing, the lens was found to exhibit unacceptable levels of chromatic aberration in the near infrared spectral range.

Schneider Corporation of America of Woodbury, N.Y., manufactures a commercial wide field of view lens operable within the near infrared range — the XENOPLAN TM 17 mm, f/1.4. The Schneider XENOPLAN TM lens is, like the above-mentioned Nikkor 1903, extremely complex. The XENOPLAN TM lens contains 5 elements and exhibits unacceptable chromatic aberration at the image edges for light entering the lens at wide field angles. The XENOPLAN TM is therefore inadequate for certain applications.

Most of the complexity found in modern lens designs is a result of efforts to reduce chromatic aberration with increasing field angle while maintaining consistent light gathering capability. In addition to such efforts, elements may be added to the design of most commercially available wide field of view lenses to enhance their versatility. The cost of such added features and complexity however leads to a lens having far too many features for use in just one specific lens application.

OBJECTS AND SUMMARY OF THE INVENTION

It is therefore an object of the invention to provide an imaging ball lens optically immersed with a fiber optic faceplate capable of providing a wide field of view that is essentially free from coma and astigmatic aberration inherent in conventional wide field of view lenses over a broad spectral range.

It is another object of the invention to provide an imaging ball lens optically immersed with a fiber optic faceplate capable of providing a wide field of view in the near infrared spectral range while displaying a minimum of chromatic aberration.

It is still another object of the present invention to provide a compact, wide angle imaging ball lens optically immersed with a fiber optic faceplate to operate with a fixed focal length and a fixed f-number, therefore requiring a minimum of lens components.

It is a further object of the present invention to provide a wide angle imaging ball lens optically immersed with a fiber optic faceplate and coupled to a CCD array such that the lens provides a flat focal plane over an extended spectral range corresponding to the size of the surface of the CCD array to which the fiber optic faceplate is optically coupled.

In one form of the invention, an imaging ball lens for wide field of view applications includes an object side and an opposite image side and has first and second plano-convex lens elements, each having planar and convex surfaces. The lens elements are arranged such that the convex surface of the first lens element is positioned facing the object side of the lens with the planar surface of the first element facing the image side. The planar surface of the second lens element is positioned facing the object side of the lens and is optically coupled to the planar surface of the first lens element. A diaphragm defining an aperture of the imaging ball lens is positioned between the first and second lens elements.

The imaging ball lens includes a plano-concave fiber optic faceplate having a concave and a planar surface. The concave surface is positioned facing the object side of the lens and is optically coupled to the convex surface of the second lens component. The optical coupling between the convex and concave surfaces of the second element and faceplate preferably forms an optical immersion (i.e., no air gap) between the second lens element and the fiber optic faceplate, which acts as a third lens element. Consequently, a curved focal plane formed at the convex surface of the second lens element is mapped into a flat focal plane at the planar surface of the fiber optic faceplate. The lens provides an image essentially free from coma and astigmatic aberration, and displaying a minimum of chromatic aberration.

The radius of curvature, $r_1$, of the first lens element is defined such that incoming collimated light received on that surface is focused onto the convex surface of the second lens element. The radius of curvature, $r_2$, of the convex surface of the second lens element is equal to the radius of curvature, $r_3$, of the concave surface of the fiber optic faceplate. The following equation is satisfied by the imaging ball lens of the present invention:

$$r_3 = r_2 = r_1(n-1)$$

where n represents the refractive index for the material comprising the first lens and second lens elements.

These and other objects, features and advantages of this invention will become apparent from the following detailed description of illustrative embodiments thereof, which are to be read in conjunction with the accompanying drawings.

DETAILED DESCRIPTION OF THE INVENTION

Figure 1:
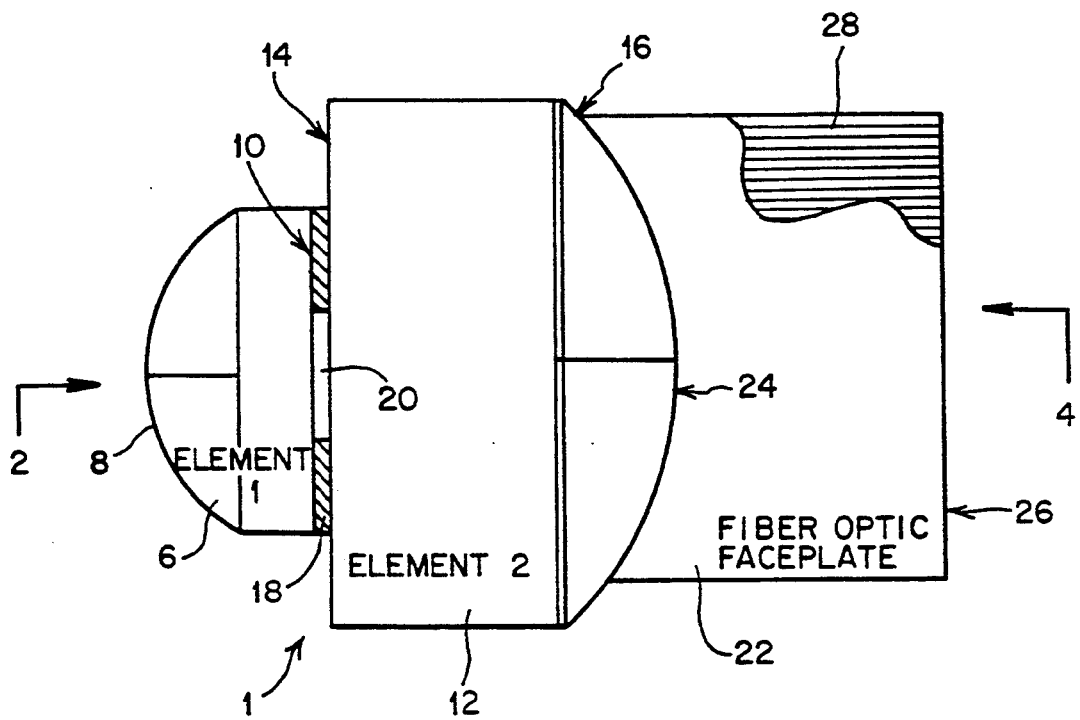
FIG. 1 is a cross-sectional view of an imaging ball lens of the present invention, with one element thereof being shown partially broken away.

FIG. 1 depicts a fixed focal length, fixed f-number, three-element imaging ball lens 1 of the present invention. The imaging ball lens of the present invention has an object side 2 and an opposite image side 4. A first element 6 of lens 1 is a conventional plano-convex spherical lens having a convex surface 8 positioned facing the object side 2 of lens 1 and an opposite planar surface 10 positioned facing the lens image side 4. Lens 1 includes a second element 12, also a conventional plano-convex spherical lens, having a planar surface 14 positioned facing the planar surface 10 of first element 6, and, therefore, optically coupling the first and second lens elements. A convex surface 16 of second element 12 disposed opposite the planar surface 10 is positioned facing the image side 4 of lens 1.

A diaphragm 18 is positioned between planar surface 10 of first element 6 and planar surface 14 of second element 12 to limit the light path through the lens elements. An aperture 20 (FIG. 2A) formed through the thickness of diaphragm 18 defines the relative aperture or f-number of lens 1 in conjunction with its focal length f', i.e, f-number=f'/($\phi_{EP}$). The diaphragm 18 may be formed as a layer or coating of a black epoxy material with the aperture 24 formed through the thickness of the coating.

First and second elements (6,12) of lens 1 may be manufactured using BK-7 ™, a type of glass produced by Schott Glaswerke of Mainz, Germany, but not limited thereto. The first element has a refractive index $n_1$ which is equal to a refractive index $n_2$ of the second lens element, that is, $n_1 = n_2$. The spectral range of a lens element is limited by a transmission range of the material comprising the lens.

The radius of curvature, $r_1$, of convex surface 8 is chosen to focus incoming collimated light onto convex surface 16 of second element 12. To do so, the radius of curvature, $r_2$, of the convex surface 16 is first defined such that:

$$r_2 = r_1/(n-1)$$

where n is the refractive index of the lens material of first and second elements 6, 12. The radius of curvature $r_2$ of convex surface 16 forms a spherical focal plane with a focal length, $f_2$, equal to the radius of curvature $r_2$.

A plano-concave fiber optic faceplate 22 comprises a third lens element of lens 1 Fiber optic faceplate 22 has a concave surface 24, positioned facing the object side 2 of lens 1, and a planar surface 26 disposed opposite concave surface 24 and positioned at the rear most image side 4 of lens 1. Concave surface 24 has a radius of curvature, $r_3$, equal to radius of curvature, $r_2$, of convex surface 16 of second element 12.

The lens focal length, f, equals the radius of curvature of both the second element 12 and fiber optic faceplate 22, $r_2$ and $r_3$, respectively. The focal length is defined as $f = nr_1$, where n is the index of refraction of the lens material of first and second element 6, 12. Because the radius of curvature, $r_3$, of the fiber optic faceplate 22 equals the radius of curvature, $r_2$, of convex surface 16, the spherical focal plane formed at the interface of the second element 12 and the faceplate 22 is transformed into a flat focal plane at planar surface 26. Due to the symmetrical nature of the design, i.e., $r_3 = r_2 = r_1/(n-1)$, the lends generates a minimum of astigmatism and provides a lens with a perfectly flat focal plane.

Fiber optic faceplate 22 (i.e., the third lens element) comprises a coherent bundle of optical fibers 28 fused together to form a solid piece of glass. The optical fibers 28 may be 6 microns in diameter. The optical fibers, such as that material comprising the faceplate 22, are optically clad, aligned and fused together. The fused fiber optic provides that images present at the object side 2 of the lens 1 are precisely coupled through to the lens' image side 4 virtually distortion free. One source for fused fiber optic material for use as a fiber optic faceplate is Part No. 32A manufactured by Schott Fiber Optics, Inc. of Southbridge, Mass., but not limited thereto.

The diameter of the entrance pupil, $\phi_{EP}$, or relative aperture of lens 1 is the aperture diameter 20 of lens diaphragm 18 as it appears from the object side 2 of the lens. The angle under which the object is seen from the entrance pupil is the object field angle. Field angle is equal to the ArcTan of the image size divided by the focal length, that is, $\tan \theta = (Y')/(f')$, where $\theta$ is the field angle and Y', is the image size. Because there are only two surfaces significant to the design of the imaging ball lens 1, i.e., convex surface 8 of first element 6 and concave surface 24 of fiber optic faceplate 22, the dimensions relating to those surfaces are the only critical design dimensions for lens 1, minimizing its complexity.

Figure 2:
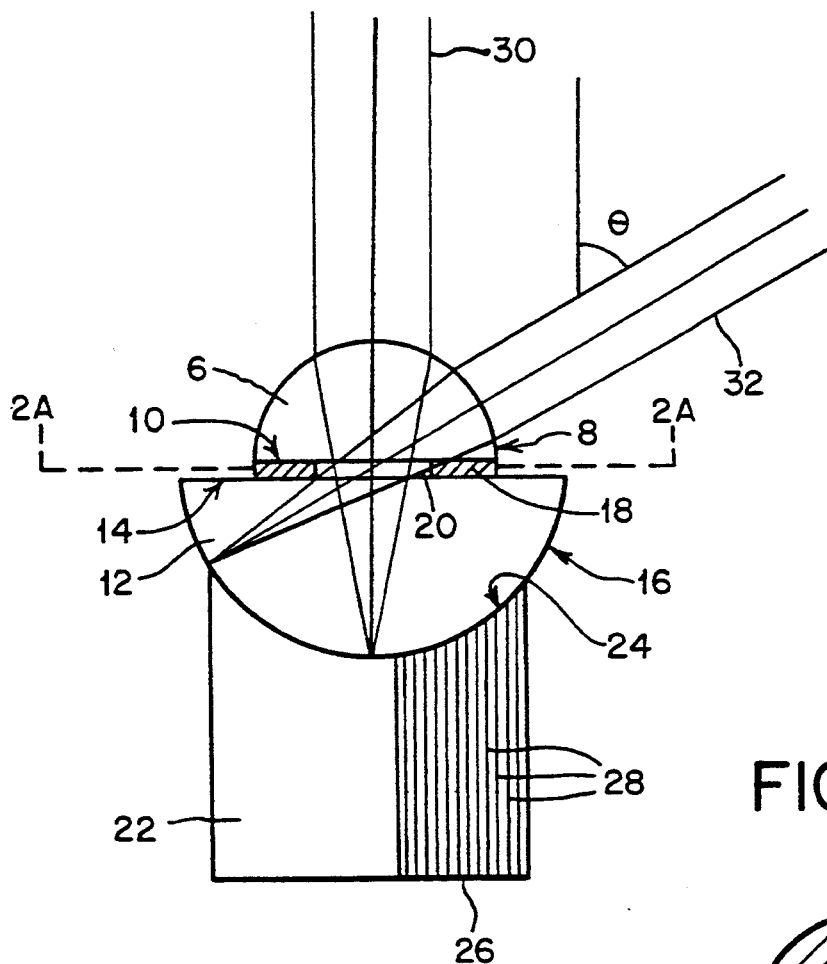
FIG. 2 is a cross-sectional view of an imaging ball lens of the present invention depicting the light directing ability of the lens.

FIG. 2 shows an imaging ball lens formed in accordance with the present invention, and illustrates an object side field angle limitation of the ball lens. The entrance pupil, $\phi_{EP}$, is the diaphragm diameter (aperture 20) as it appears from the lens image side 2. The entrance pupil, $\phi_{EP}$, dependent on factors such as lens thickness and aperture, limits the light passed through the lens. The figure shows collimated light in the form of rays 30 and 32, arriving incident at a convex surface 8 of a first element 6. Rays 30 arrive in a vector direction normal to the plane of planar surface 10, i.e., field angle $\theta = 0°$. Rays 32 are shown arriving from an off-axis direction, i.e., at an angle $\theta$ relative to the above-mentioned normal.

Figure 2A:
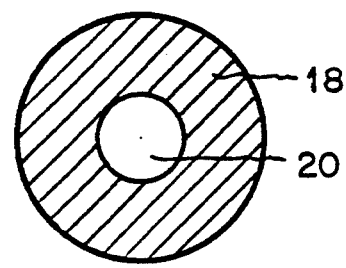
FIG. 2A is a cross sectional view of the lens assembly shown in FIG. 2 and taken along line 2A—2A and showing a diaphragm defining an aperture used with the present invention.

Light rays 30 and 32 are directed by first element 6 through aperture 20 of diaphragm 18 (FIG. 2A) into second element 12. Light rays 30 and 32 are coupled through to concave surface 24 irrespective of their angle of incidence. There the light rays form a curved focal plane at the interface between convex surface 16 of the second lens element 12 and concave surface 24 of the fiber optic faceplate 22 (third element). The curved focal plane attempts to redirect the light into optical fibers 28 which may be coupled through to the faceplate's planar surface 26. The curved focal plane is thereby mapped into a flat focal plane at planar surface 26. A cross sectional view of diaphragm 18 depicting aperture 20 is shown in FIG. 2A.

Figure 3:
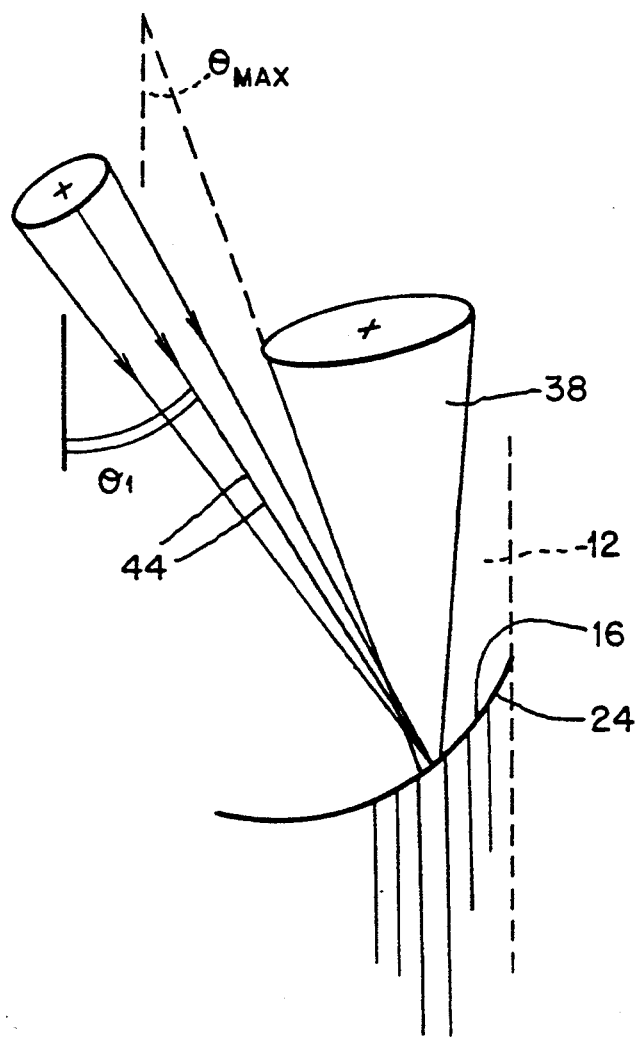
FIG. 3 is a cross sectional view of a portion of an imaging ball lens of the present invention which illustrates a maximum angle of acceptance for light entering a faceplate portion of the lens.
Figure 3A:
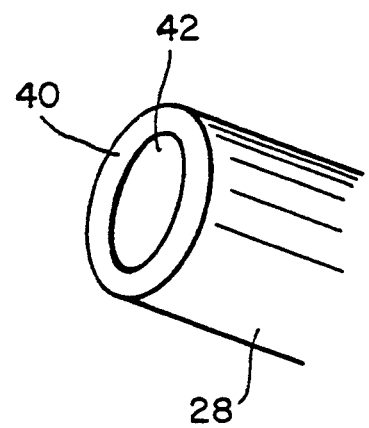
FIG. 3A is an enlarged perspective view of one of a multiplicity of optic fibers which form a faceplate portion of the lens of the present invention.

In addition to entrance pupil diameter, another factor limits lens field angle. The light focused at the interface formed between convex surface 16 and concave surface 24 may be outside the acceptance cone of the fiber optics comprising fiber optic faceplate 22. Light incident at concave surface 24 of fiber optic faceplate 22 at angles greater than the angle of the acceptance cone is not coupled through the optical fibers. FIG. 3 depicts a cone of acceptance 38 for light incident upon an interface formed between convex surface 16 of second lens element 12 and concave surface 24 of a fiber optic faceplate 22. FIG. 3A shows a cladding 40 and a core 42 of an optical fiber 28.

The maximum angle of incidence, $\Theta_{MAX}$, for which light will be transmitted through the immersed optical fiber 28 is:

$$\Theta_{MAX} = \text{ARC SIN} (NA/n_g)$$
$$= \text{ARC SIN} (n_f^2 - n_c^2)^{\frac{1}{2}}/n_g) = 44.1°$$

where NA is the numerical aperture of optical fiber 28. $n_g = 1.51$, where $n_g$ is the refractive index of lens glass; $n_f = 1.81$, where $n_f$ is the refractive index of fiber core 42 of optical fiber 28 and $n_c = 1.48$, where $n_c$ is the refractive index of the fiber cladding 40 of the optical fiber. Light rays 44 are shown incident at the above-mentioned interface at an angle $\theta_1$. Because $\theta_1$ is greater than $\theta_{MAX}$, the angle defined by the cone of acceptance 38, light rays 44 are not coupled through to the planar surface of the faceplate.

EXAMPLE 1

A three-element imaging ball lens was produced in accordance with FIG. 1 and the above description. The full size of the lens was approximately ¾ inch in height and ½ inch in diameter. The dimensions of the lens are listed in Table 1. The listed dimensions exclude mounting structure.

The cumulative thickness tolerance on the first and second elements equaled ±.08 mm and the centering of first and second elements was ±.035 mm.

TABLE 1

|  |  | R.O.C. | Thickness |
|---|---|---|---|
| 1ˢᵗ element (6) | convex surface (8) | 3.86 mm ± .08 mm | 3.86 mm |
|  | planar surface (10) | ∞ |  |
|  | Aperture Diameter (20) | 0.53 mm ± .05 |  |
| 2ⁿᵈ element (12) | planar surface (14) | ∞ | 7.45 mm |
|  | convex surface (16) | 7.45 mm ± .05 mm |  |
| 3ʳᵈ element (22) | concave surface (24) | 7.50 mm | 12.5 mm |
|  | planar surface (26) | ∞ |  |

The maximum diagonal field of view achieved by the imaging ball lens was found to be 88°. This resulted from a $\Theta_{MAX}$ or maximum field angle equal to 44°. The full angle field of view (88) results from the addition of $\Theta_{MAX}$ on both sides of the normal. The lens aperture, the lens thickness, and the acceptance cone limitations of the fiber optics comprising third element 22 were design factors which were reflected in the field angle limitations of the lens.

The resulting three-element imaging ball lens was found to be essentially free from coma and astigmatic aberration at the 44° field angle. Spherical aberration was minimized in accordance with the entrance pupil diameter. The lens displayed a minimum of chromatic aberration over its wide spectral range, i.e., 540–1060 mm. The lens was simple and compact due to its fixed f-number and fixed focal length.

The value calculated for the entrance pupil (relative aperture), $\phi_{EP}$, of the lens for a focal length fixed at 7.5 mm and an f-number fixed at 10 was 0.75 mm. The ratio of the aperture to the lens focal length approximates the ratio of the entrance pupil, $\phi_{EP}$, to the thickness of the first two elements. The aperture was fabricated at approximately 0.50 mm. The measured thickness of the first two elements was 11.31 mm. The entrance pupil $\phi_{EP}$ was calculated to be 0.754 mm., at convex surface 8 of first element 6. This value was very close to the desired relative aperture value, 0.75 mm.

Figure 4C:
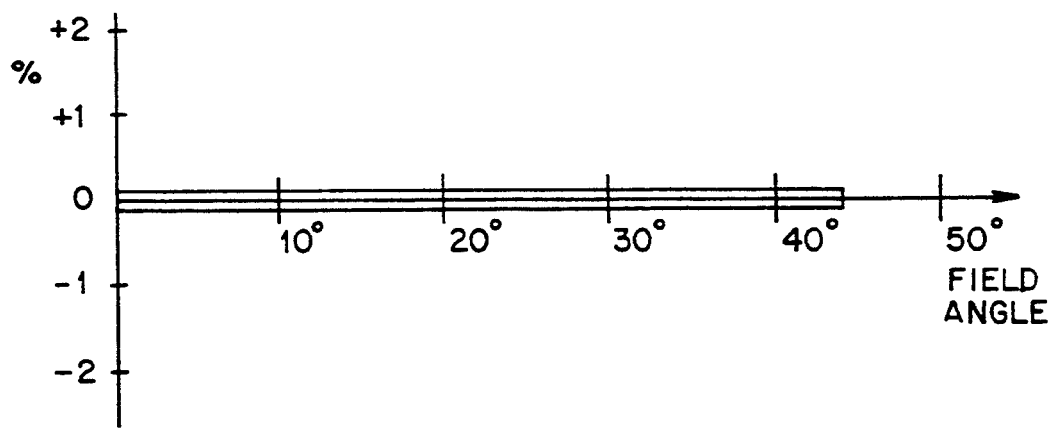
FIG. 4C is a plot of the percentage of radial distortion versus field angle for a lens designed according to the present invention.
Figure 4A:
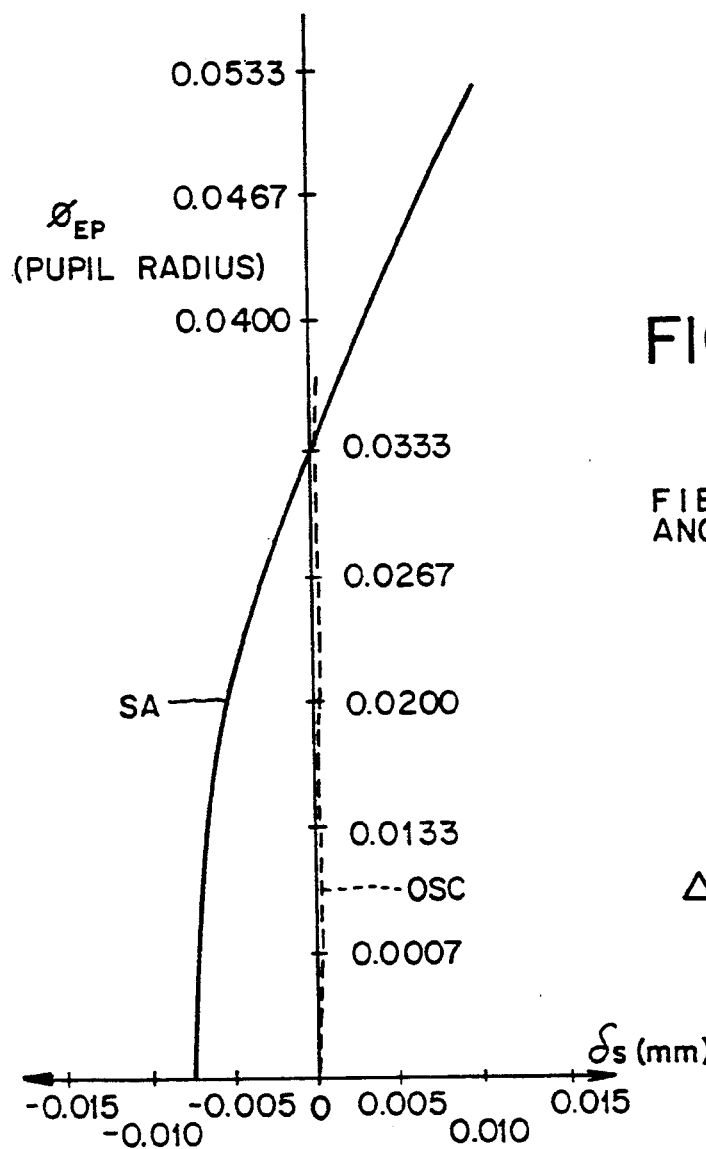
FIG. 4A is a plot of lens entrance diameter versus spherical aberration and offense against sine condition in units of longitudinal aberration for an imaging ball lens formed in accordance with the present invention.
Figure 4B:
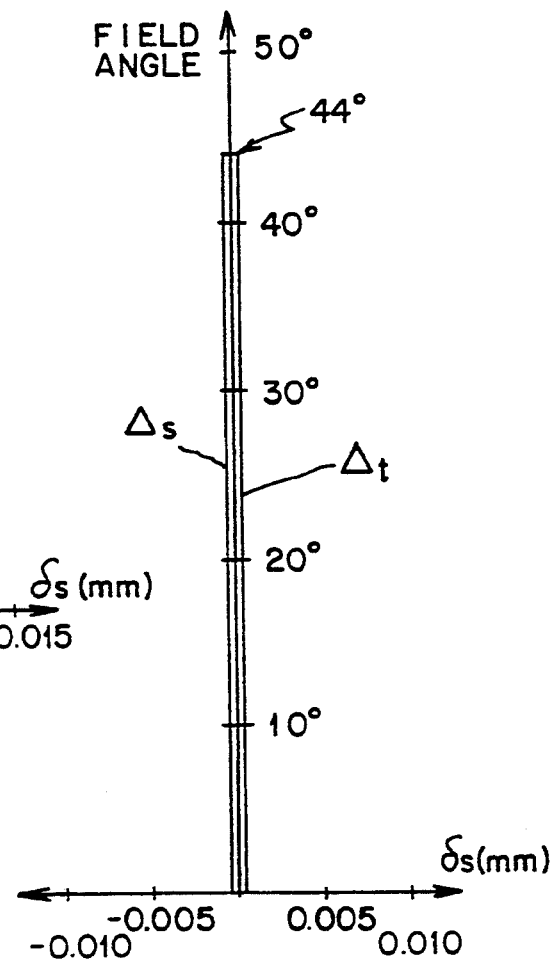
FIG. 4B is a plot of field angle versus sagittal and tangential astigmatism in units of longitudinal aberration for a lens designed according to the present invention.

FIGS. 4A, 4B and 4C show the calculated performance curves of the above-described imaging ball lens.

FIG. 4A depicts pupil radius $\phi_{EP}$ vs. spherical aberration (SA) and Offence Against Sine Condition (OSC) in units of longitudinal aberration factor, $\delta s$ at concave surface 24 of the third element 22. Offense Against Sine Condition indicates the presence or absence of coma near the central regions of the field. The data shown reflects a normalized lens focal length, i.e., $f=1$. The variable SA is a measure of spherical aberration. The thickness of the second element 12, i.e., 7.45 mm $\pm$ 0.05 mm, was optimized at f number f/10.

The figure shows an OSC (designating coma) that was essentially zero for the lens. The magnitude of SA is shown equal for the minimum and maximum pupil radii of the lens. This results from an initial determination of $r_1$ for the first lens element 6 were such that $r_2 = r_1/(n+1)$. Radius $r_1$ was then shifted by a very small percentage of the calculated value in order to render essentially zero the aberration at the preferred pupil radius, ie., 0.0333 in the normalized case. Otherwise, the lens would display zero aberration only for a pupil radius of zero.

FIG. 4B depicts field angle $\theta_{MAX}$ versus sagittal and tangential astigmatism at concave surface 9 of third element 22. In the figure, the variable $\Delta_S$ represents sagittal astigmatism in units of longitudinal aberration, $\delta s$. Longitudinal aberration $\delta s$ is negative when the sagittal focus of the lens lies closer to the lens than the lens paraxial focal plane. $\Delta_T$, the tangential astigmatism, is also shown in the FIG. 4B in units of longitudinal aberration, $\delta s$. Astigmatism was essentially zero due to the symmetrical nature of the lens design.

FIG. 4C depicts radial distortion as radial distance of the image from the center of the field as a function of field angle. The radial distortion is measured in per cent deviation of the image from the center of the field. When the deviation is positive, the actual image is at a slightly greater distance from the field than an ideal image. The distortion was essentially zero, attributable to the symmetrical nature of the lens.

As can be seen from the preceding description, the three-element imaging ball lens design of the present invention is advantageous in that a simple, low cost, wide field of view lens may be produced that is essentially free from coma and astigmatic aberration and which displays a minimum of chromatic aberration over an extended spectral range. The lens consists of two optically coupled plano-convex elements optically coupled to a third element, i.e., fiber optic faceplate, such that the second element is optically immersed with the fiber optic faceplate. By optically immersing the fiber optic faceplate with the combination first and second elements, the spherical focal plane formed at an interface is transformed to a flat focal plane for coupling the image to a self-scanned array such as a charge coupled device.

Illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

We claim:

1. An imaging ball lens for wide field of view applications, the imaging ball lens having an object side and an image side, comprising:
   a first plano-convex lens element having a convex surface and a planar surface, the convex surface facing an object side of the lens;
   a second plano-convex lens element having a convex surface and a planar surface, the planar surface of the second lens element being optically coupled to the planar surface of the first lens element, the planar surface of the second lens element facing the object side of the lens;
   a diaphragm positioned between the first and second lens elements defining an aperture of the lens; and
   a plano-concave fiber optic faceplate having a concave surface and a planar surface, the concave surface of the fiber optic faceplate being optically coupled to the convex surface of the second lens element, the concave surface facing the object side of the lens such that the second lens element is optically coupled to the fiber optic faceplate, and wherein a curved focal plane formed at the convex surface of the second lens element is mapped into a flat focal plane at the planar surface of the fiber optic faceplate.

2. An imaging ball lens as defined by claim 1, wherein a lens focal length ,f', and a lens f-number, f/, are predetermined constant values.

3. An imaging ball lens as defined by claim 2, wherein a lens aperture diameter is about 0.5 mm, the fixed focal length is about 7.5 mm and the fixed f-number is about f/10 such that an entrance pupil diameter, $\phi_{EP}$, of the lens satisfies the following equation:

$$\phi_{EP} = (0.5)(T) \div (7.5)$$

where T is the combined thickness of the first and second lens elements.

4. An imaging ball lens as defined by claim 1, wherein an operating spectral range for the lens is from about 540 to about 1060 nm.

5. An imaging ball lens as defined by claim 1, wherein the field of view extends approximately 70 degrees in azimuth.

6. An imaging ball lens as defined by claim 1, wherein the convex surfaces of the first and second lens elements define a common center of curvature.

7. An imaging ball lens as defined by claim 1, wherein the fiber optic faceplate comprises a coherent bundle of fibers, each fiber being about 6 microns in diameter.

8. An imaging ball lens as defined by claim 1, wherein a radius of curvature, $r_1$, of the convex surface of the first lens element is defined such that incoming collimated light received thereon is focused onto the convex surface of the second lens element, and the radius of curvature, $r_2$, of the convex surface of the second lens element is equal to the radius of curvature, $r_3$, of the concave surface of the fiber optic faceplate such that the following equation is satisfied:

$$r_3 = r_2 = r_1/(n-1)$$

where n is the refractive index for the first and second lens elements.

9. An imaging ball lens as defined by claim 1, wherein the second lens element is optically immersed with the fiber optic faceplate.

* * * * *